Figure 1:
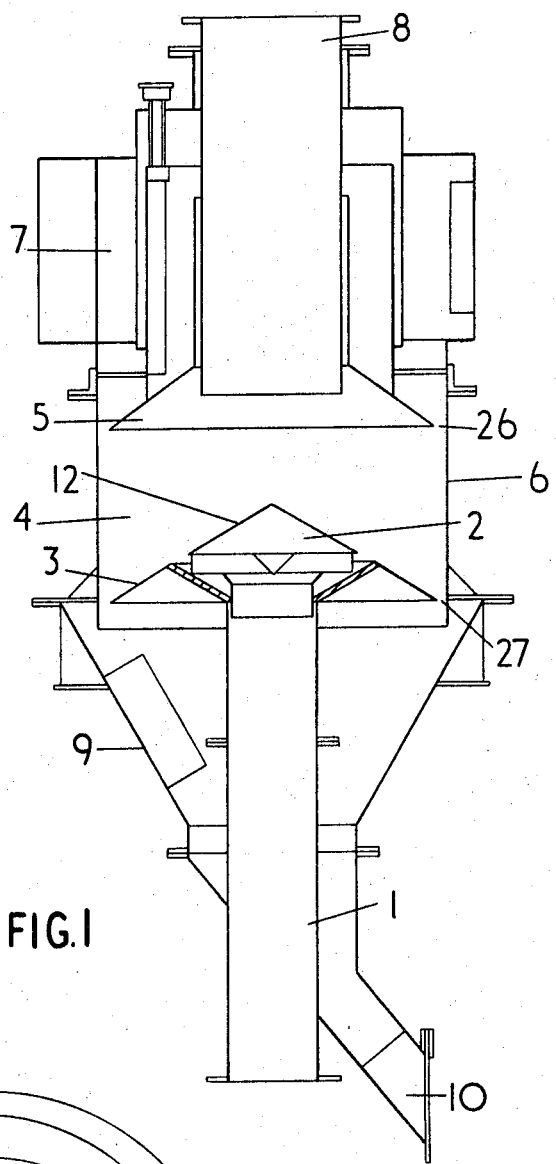

United States Patent

Mansson

[15] 3,643,800
[45] Feb. 22, 1972

[54] APPARATUS FOR SEPARATING SOLIDS IN A WHIRLING GASEOUS STREAM

[72] Inventor: Bo Gustav Emil Mansson, Sandgatan 40, Enkoping, Sweden

[22] Filed: May 21, 1969

[21] Appl. No.: 826,527

[52] U.S. Cl. ..........................................209/144, 209/148
[51] Int. Cl. ..........................................................B04c 3/06
[58] Field of Search ..................209/144, 211, 148, 150; 210/512; 55/456, 457, 261, 266

[56] References Cited

UNITED STATES PATENTS

| 2,496,281 | 2/1950 | Fisher | 55/261 X |
| 2,823,801 | 2/1958 | Strohl | 209/211 X |
| 3,199,270 | 8/1965 | Oehlrich | 55/456 X |
| 3,396,511 | 8/1968 | Fracke et al. | 55/456 X |
| 3,466,853 | 10/1969 | Buick et al. | 55/456 X |

Primary Examiner—Frank W. Lutter
Assistant Examiner—William Cuchlinski, Jr.
Attorney—Holman & Stern

[57] ABSTRACT

A device for separating solids having a cylindrical separating chamber, an axial inlet for introducing a whirling gaseous suspension into said chamber and including an annular plate extending radially outwardly and downward therefrom defining an annular gap with the chamber wall. An upper axially disposed outlet includes an upper annular plate defining an upper annular gap with the wall of said chamber. A scroll structure imparts a rotary motion to a secondary gaseous stream in the same direction as the feed suspension.

6 Claims, 8 Drawing Figures

PATENTED FEB 22 1972 3,643,800

SHEET 1 OF 5

INVENTOR
BO GUSTAV EMIL MANSSON
BY Holman, [illegible],
Downing & [illegible]
ATTORNEYS

APPARATUS FOR SEPARATING SOLIDS IN A WHIRLING GASEOUS STREAM

The present invention relates to a device for the fractionation of solid granular, particulate and/or fibrous material, comprising one or more components.

Dust precipitation, by which is usually understood the technique of removing solid dust particles from streaming gases, is a singularly important part of industrial technology. In the simplest case the object of dust precipitation may be to remove insofar as possible all the particles from a stream of gas, so as to be able to release clean gas into the atmosphere. It may also be desirable to purify a gas stream before it is passed on to a further manufacturing stage, whose operational safety depends on the supplied gas stream being at least substantially free from solid particles.

An important aspect of dust or powder separation consists in removing from a gas stream and preserving such solid particles as are to be used for processing or fabrication of some kind or other. A large number of devices of various types are known by means of which such powder separation can be carried out on an industrial scale, reference here being only made to the so-called cyclones, electric filters, wet separators and so-called total or blocking filters.

It is often desirable to sort out pulverous materials into fractions of different grain size whilst the particles are being separated or removed from a stream of gas. A process which is usually called wind sifting is known to have been used wherein the separation of inhomogeneous material is effected by making use of the different dropping speeds of its constituent particles in a gas, normally air, in accordance with Stokes law.

In the simplest case gravity is utilized for this purpose as the acting force. The techniques of wind sifting have been further developed by the introduction of centrifugal separators. By these devices the forces acting upon the particles suspended in a stream of gas are very considerably enhanced by centrifugal and like forces that arise from and are connected with the rotary motion imparted to the gas stream in a usually cylindrical separator chamber.

Thus the stream of gas tends so to act upon the finer particles in the inhomogeneous material so that they spiral down towards the center of the separator chamber. The inertia of the particles opposes this action, and large or coarse particles, especially those that are introduced tangentially, tend to maintain their direction of motion until they collide with the outer walls of the separator chamber. Particles of intermediate grain size will be endowed with a speed and direction of motion which fall between the two indicated limits, and in any given conditions some particles will circle in a path of fixed radius with substantially the same speed as the rotating gas streams. This will happen when the centrifugal force acting on such a particle imparts to it an outwardly directed velocity which is exactly canceled by its dropping speed that is directed radially inwards.

A number of different designs of wind separators are known, and these may be classified, for instance, according to the manner in which the material that is to be sifted and graded is fed in.

The material may be fed into the wind sifter (separator) by means of a mechanical conveying arrangement or feed apparatus. If a pneumatic conveying device is included in the path followed by the material, the material is wholly separated from the entraining air and the inhomogeneous material is then introduced into the wind separator.

A mechanical feed is useful in the case where particulate or granular inhomogeneous material is produced without an airflow, or where transport by mechanical devices is most convenient for other reasons.

In other cases, however, a preliminary feed or crushing process may be carried out with a flow of gas, usually air. The conveying may even be easier and simpler by pneumatic means, and it is then of advantage for the wind sifting to take place without an intermediate separation of inhomogeneous material or powder and air. Wind separating devices are known which can accept and deal with a flow of powder-laden air.

Wind separators with a basically pneumatic feed of material, however, fail to reach the desired degree of efficiency. Moreover, the sorting and separating results depend to a great extent on the quantity of the material supplied and the possibility of varying and adjusting the functioning of the conventional centrifugal wind separators is greatly restricted, which reduces their operational range. Even those wind separators where the material to be processed is fed in mechanically the precision of separation depends on the nature of the material and they have a narrowly restricted operational range.

It is, therefore, necessary to choose different designs of wind separators for different cases of separation, and this is clearly a further drawback.

A centrifugal wind separator for industrial use, especially where large quantities of material are involved, should have such flexibility of use that pneumatically conveyed material can be introduced into the separator without intermediate separation. It should also be possible to inject a mechanically conveyed flow of material into a circulating flow of air. The process of separation should also follow a stable course, yet be amenable to variation within a wide range, so that different materials can be sorted out with the desired approximation.

The present invention provides a centrifugal wind separator which, unlike the hitherto known devices, satisfies these requirements and has, in addition, the desired flexibility even in handling different types of material when the flow of material is greatly variable.

The invention includes a method and a device, namely a centrifugal wind separator for the fractionation of solid granular, particulate, and/or fibrous material, containing one or more components, the said material being introduced into a substantially cylindrical separator chamber in suspension in a primary gas stream, wherein the primary gas stream, which is usually a stream of air with the material suspended therein, is centrally introduced into the separator chamber after the gas stream and the material suspended in it has been set into rotary motion, and that this gas stream is combined with a secondary stream of gas rotating in the same sense which is introduced into the separator chamber.

Pneumatically conveyed material can be introduced straight into a centrifugal wind separator according to the present invention without prior separation. A mechanically conveyed flow of material can likewise be simply injected into the primary airflow. The separating process is stabilized by compelling the flow of air and material entering the separator chamber to rotate, for example, by means of a variable guide apparatus. Further, the volume of the separator chamber can be varied, and the process of separation can be varied within wide limits by altering the ratio of the powder-laden stream of primary air and the concordantly rotating secondary gas stream, which is preferably a tangentially entering airstream. As compared with the conventional devices this results in a substantial widening of the operational and sorting range, as well as in a greatly enhanced efficiency of separation.

Figure 2:
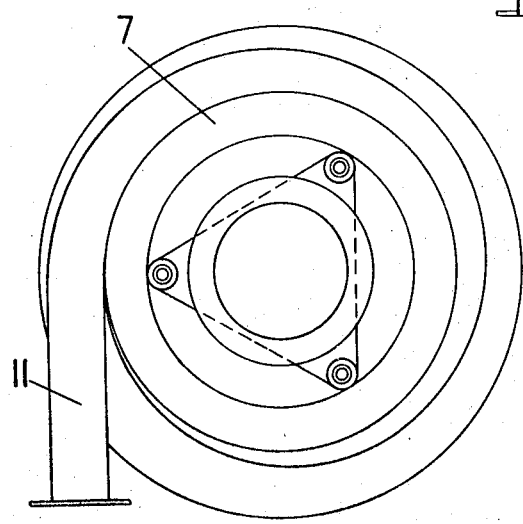
Figure 3:
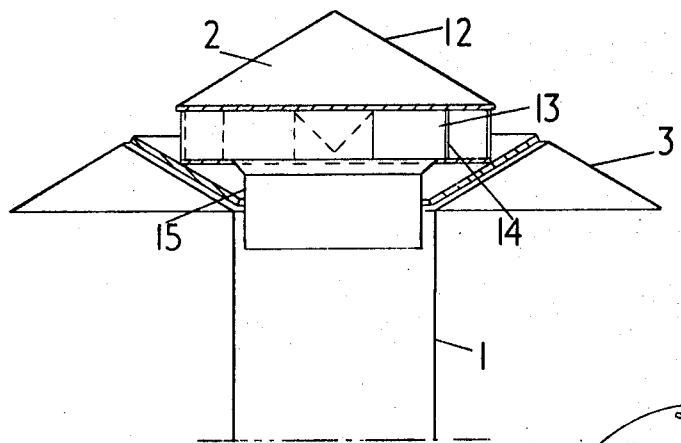
Figure 4:
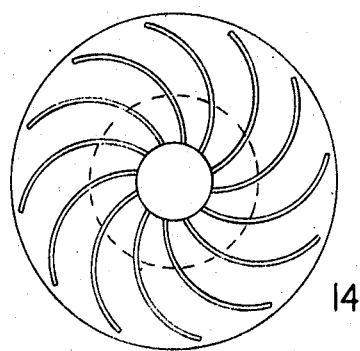
Figure 5:
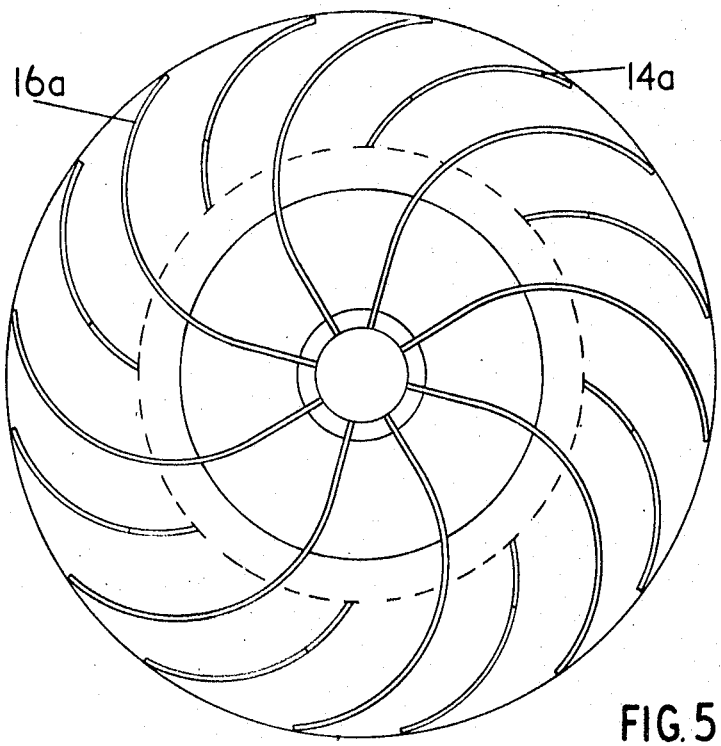

The invention will now be described with reference to the accompanying drawings, which illustrate the invention but are in no sense restrictive of the scope of the invention. These drawings shown in:

FIG. 1 a section of a centrifugal wind separator according to the invention;

FIG. 2 the same centrifugal wind separator seen from above;

FIG. 3 a guiding device seen in section;

FIG. 4 a detail of the guiding device shown in FIG. 3;

FIG. 5 another embodiment of the guiding device; and

Figure 6:
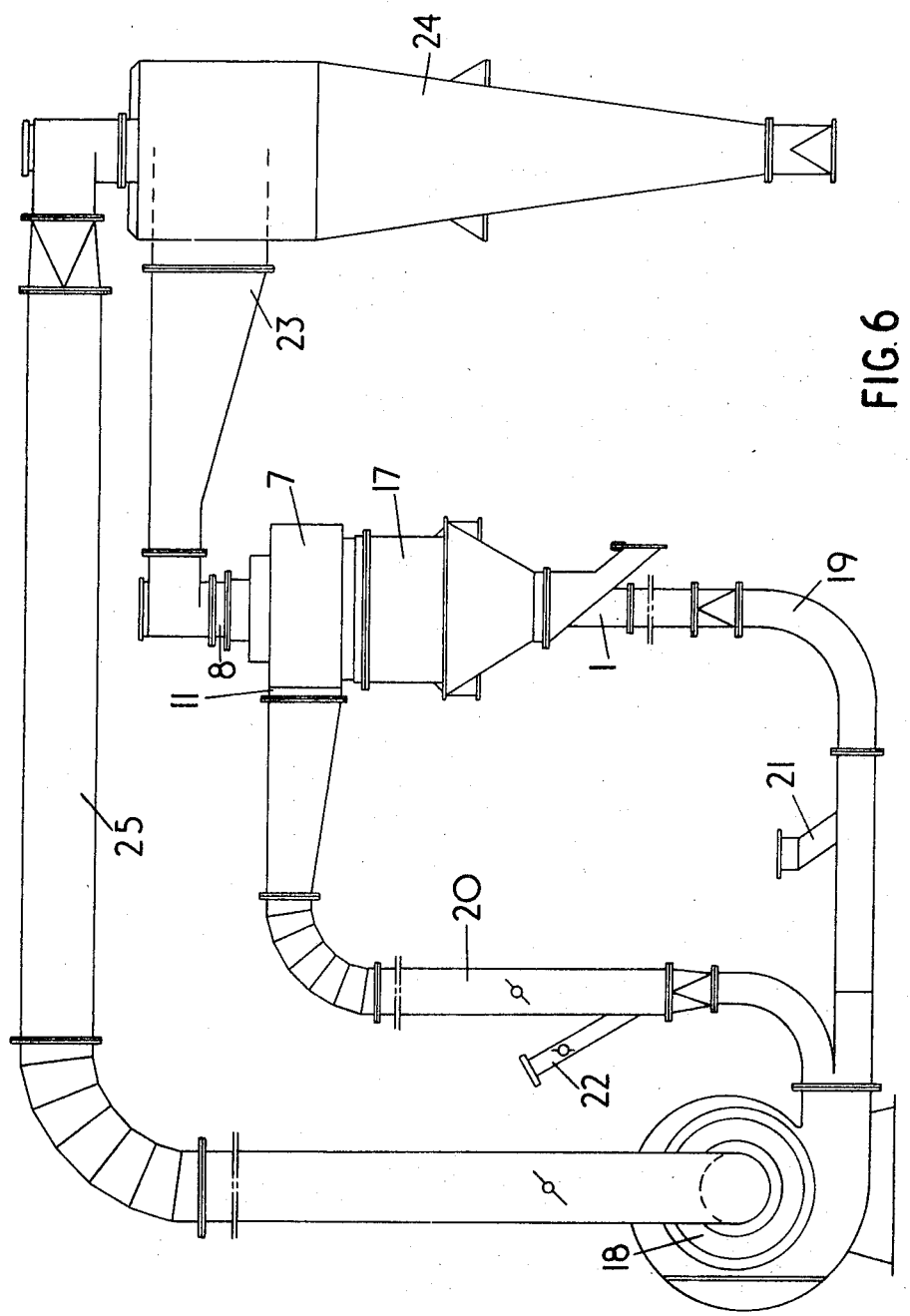

FIG. 6 a diagram illustrating the principles of a separator system comprising a centrifugal wind separator according to the invention.

A centrifugal wind separator comprises a separator chamber 4, which is outwardly bounded by a cylindrical jacket 6. An inflow pipe 1 leads into the separator chamber and terminates in a guiding apparatus 2 having a substantially annular limiting guide plate 3. From the separator chamber runs an outflow pipe 8 with a substantially annular limiting guide plate 5. The guiding device 2 is accommodated in a substantially conical housing (see below) with a conical roof 12, which jointly with the guide plate 3 forms the lower boundary of the separator chamber. The separator chamber is upwardly bounded by the guide plate 5, which together with the outflow pipe 8 is movably mounted in the axial direction, whereby the height of the separator chamber can be varied.

Around the outflow pipe 8 there is arranged above the guide plate 5 a casing 7 with a helical gas duct, having an inlet 11 and opening out tangentially into the separator chamber.

The separator chamber is closed from below by a conical funnellike member 9 with a tapping aperture 10, which may be equipped with a sluice means.

In one form of embodiment (see FIGS. 3 and 4) the guiding device 2 consists of the conical roof 12 above a guide chamber 13. In the guide chamber, which is formed as a direct extension of the inflow pipe 1, there is provided a plurality of spiral guides 14 in communication with a pipe connection 15.

The roof 12 may be made upwardly or axially movable, and in another advantageous form of embodiment (see FIG. 5) the guiding device has been additionally provided with a plurality of spiral guides 16a on the underside of the movable roof 12, the said guides 16a coacting with the spiral guides 14a on the pipe connection 15.

FIG. 6 shows the principle of how a centrifugal wind separator 17 according to the invention may be advantageously fitted into a separating system. A conventional blower 18 delivers air, partly to a duct 19 connected to the inflow pipe of the centrifugal wind separator, and partly to a duct 20 connected to the inlet 11 to the spiral guides in the casing 7.

The duct 19 is provided with an opening having a connector 21 for feeding in the material that is to be separated, the supply being preferably delivered by means of a cellular feeder. The duct 20 is preferably provided with an opening with a connecter 22 which can be used, if desired, for draining the separator system.

The outflow pipe 8 of the centrifugal wind separator is connected to a duct 23, which in its turn leads to a conventional dust separator, for instance, a swirler 24. The air outlet of the swirler communicates through a duct 25 with the inlet of the blower 18.

When the separating plant and the centrifugal wind separator are in operation the material that is to be fractionated is introduced through the connector 21 and is carried by an airstream, known as the primary airstream, from the blower 18 through the pipe 19 and the inflow pipe 1 to the guiding device 2. By the guides 14 (or 14a and 16a), provided in the guide chamber 13, a continuous rotary motion is imparted to both the primary airstream and the material suspended therein and it is then centrally introduced into the separator chamber 4.

In the separator chamber the grains or particles composing the material are exposed in a way known as such to the outwardly directed centrifugal force, which strives to drive more particularly the coarser grains out towards the jacket 6. In addition the particles are acted upon by a frictional force owing to the movement of particles relatively to the airstream, and this latter force tends to keep the particles and more particularly the finer particles suspended in the air stream or to convey them towards the center of the separator chamber with a certain precipitating (dropping) speed.

Another airstream, known as the secondary airstream, is directed from the blower 18 through the duct 20 to the inlet 11 of the spiral gas or air guide provided in the casing 7. From the latter duct the secondary airstream flows tangentially into the separator chamber through an annular gap 26 between the plate 5 and the jacket 6. Thus the secondary airstream is set rotating in the separator chamber by means described herein, in the same sense as the primary airstream with the material suspended therein, is set rotating by the guiding apparatus 2.

The secondary airstream serves here to stabilize and reinforce the material-bearing primary airstream in its continuous rotation. The further important purpose of the secondary airstream is to "search out" for finer particles the material carried towards the jacket 6. This occurs owing to the fact that the secondary airstream captures all those particles which have the same dropping speed as or a lower one than the radial velocity of the rotating air mass.

The primary and the secondary airstream become united in the separator chamber 4 and exit through the outflow pipe 8, entraining the fine-grained part or fraction of the material which is to be separated. This material can be collected in a known way in a separator device, such as a swirler (cyclone) 24.

As described above, the coarser grains in the material are driven towards the jacket 6. Thereupon the coarser grains or the coarse fraction drops under the action of gravity through an annular gap 27 which is bounded by the jacket 6 and the guide plate 3. Then the coarse fraction drops through the funnel-shaped member 9 to the tapping aperture 10, whence it may be advantageously removed by means of a sluice device.

The separating efficiency, the grading range, as well as the operational range and so the flexibility of the centrifugal wind separator according to the invention will be seen from the examples given below, which are of a merely illustrative nature.

The splitting limit in an inhomogeneous material is hereby defined as the grain size at which the weight percentage of grains of equal size or larger than this size in the fine fractions is equal to the weight percentage of grains of equal size or smaller than this size in the coarse fraction. The splitting limit is determined by plotting the separation curves which are obtained from the dry separation analysis of the two fractions by means of any laboratory separator (mass analyzer). The grain size at the point of intersection of the curves is the so-called splitting point.

The sharpness (precision) of a separating operation is defined as the weight percentage of grains in the fine fraction of equal size or smaller than the splitting point (and is equal to the weight percentage of grains larger than the splitting point in the coarse fraction). The larger the substantially horizontal part of at a percentually low level when grain size is on the abscissa a series of splitting points have in a series of tests with a separator apparatus using the same raw material and different settings of the apparatus, the more flexible is the apparatus over a wide range of grain sizes.

EXAMPLE 1

Figure 7:
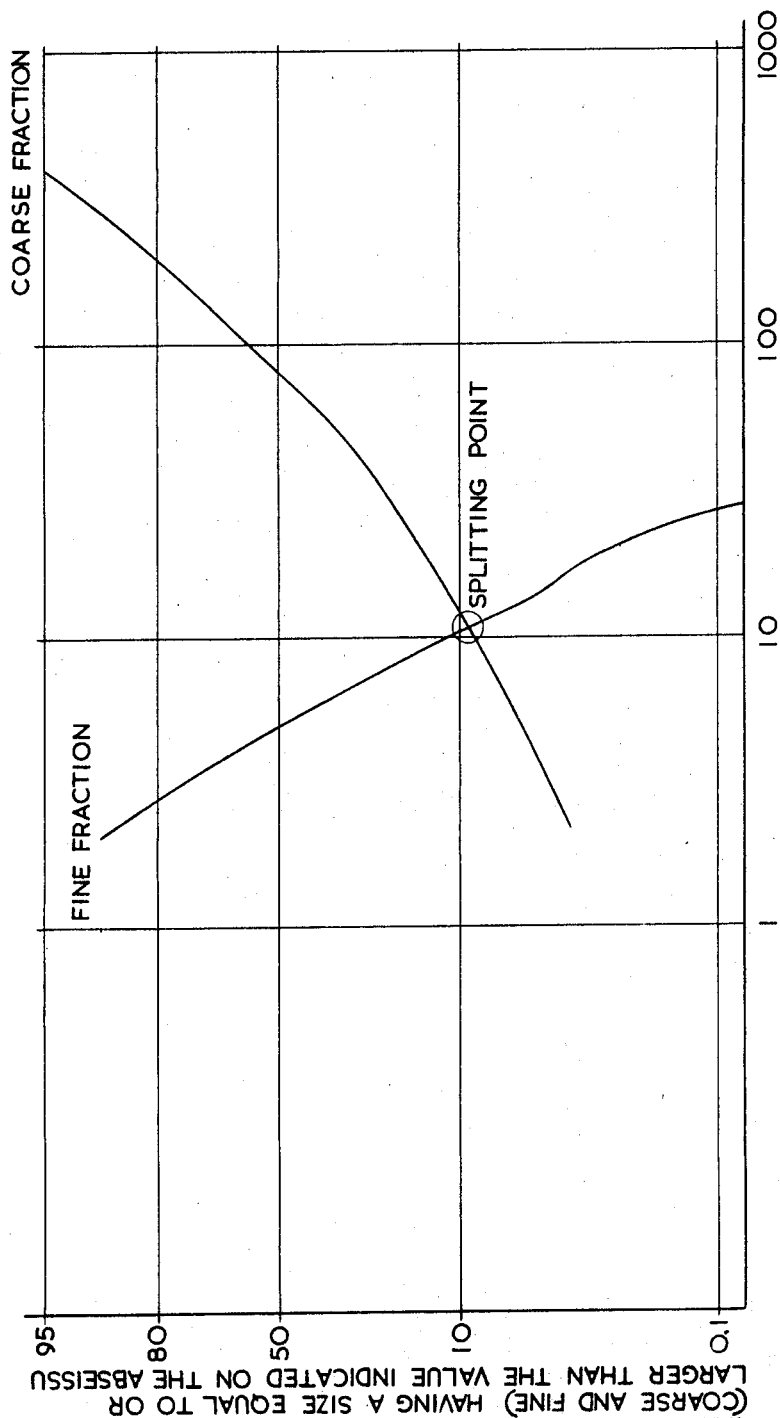

A ground sandy kaoline clay sample was subjected separation and fractionation in a centrifugal wind separator according to the invention. The charge was 1,270 kg./hr., the air quantity in the primary airstream was 1,350 m.$^3$/hr., and in the secondary airstream 2,200 m.$^3$/hr. The optimal or approximately optimal heights of the separator chamber and the guide chamber had been chosen by preliminary tests. FIG. 7 shown the separation curves for the fine fraction (curve 1) and the coarse fraction (curve 2), plotted in the conventional way after a precise sifting (mass) analysis.

As will be seen from FIG. 7, a sharp splitting limit is obtained in this test at a grain size of 10.1 $\mu$m. and the splitting point gives a sharpness of 8.5 percent.

EXAMPLE 2

Figure 8:
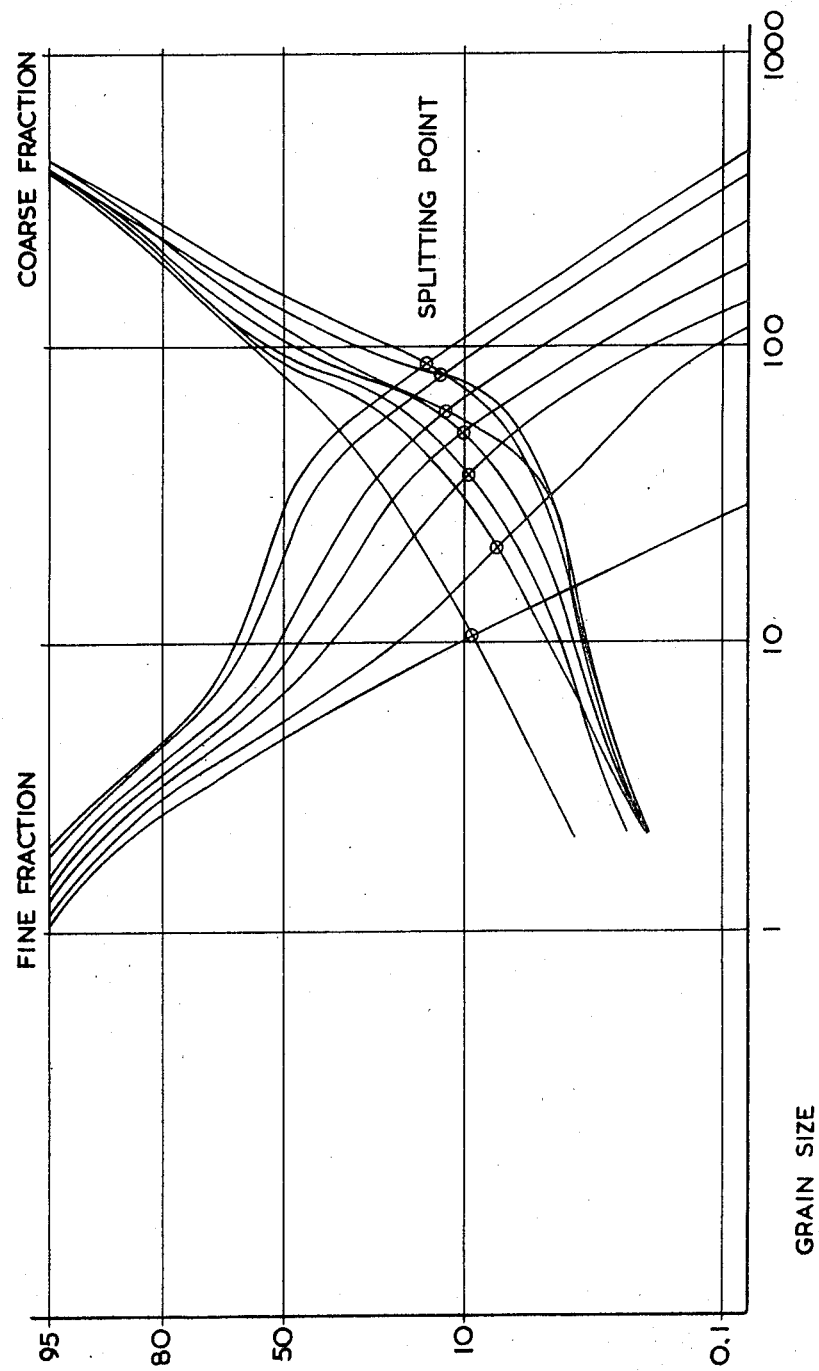

The coarse fraction from Example 1 was fractioned in a series of tests employing a centrifugal wind separator according to the invention. FIG. 8 shows a diagram of the distribution of grain sizes in the fractions thus obtained. The input material in every test has been the coarse fraction from Example 1. It will be seen that the splitting point could be moved within wide limits without loss of the good splitting sharpness by varying in the first place the height of the separator chamber and that of the guide chamber.

EXAMPLE 3

A series of tests was carried out on the separation of a sandy ground clay. The moisture content of the clay was 1.5 percent, and this gave the following values in dry separation analysis:

| Particle Diameter μm. | | | 500 | 250 | 125 |
|---|---|---|---|---|---|
| Separation Residue % by weight | | | 0.6 | 5 | 23 |
| (1μm. = 0.001 mm.) | 62 | 31 | 16 | 8 | 4 | 2 |
| | 55 | 66 | 73 | 80 | 90 | 97 |

The clay was separated (sifted) in a conventional motor-driven wind separator, where a centrifugal field was generated by feeding in the material over a rotating plate and into blower vanes mounted in the separator chamber (Test No. 1), on the one hand, and in a centrifugal wind separator according to the invention (Test No. 2), on the other. In the test series 2 the air quantities and operational parameters in the centrifugal wind separator were varied as follows (see Table 1):

Test I

The secondary airflow approximately equal to the primary airflow. The fastest possible rotation of the primary air and of the material suspended in it by reducing the guide chamber height to a minimum. The greatest possible height of the separator chamber (Ia) and a lower height (Ib).

Test II

The secondary airflow much greater than the primary airflow. Maximal rotation as in Test I. The greatest possible height (IIa) of the separator chamber and a lower height (IIb).

Test III

The secondary airflow somewhat larger than the primary airflow. Slow rotation of the primary air and suspended material by raising the height of the guide chamber. Greatest possible height (IIIa) of the separator chamber and a lower height (IIIb).

The result of the test series according to Example 3 will be found in Table 1. The tests show that the conventional wind separator has a considerably lower splitting efficiency and capacity than the wind separator according to the invention for substantially the same air supply reckoned per unit weight of the material fed in.

I claim:

1. A device for obtaining fractions of a subdivided solid material, comprising:

a substantially cylindrical separating chamber having an upright axis;

an axially positioned inlet at the bottom of said chamber for a primary gas stream which contains suspended subdivided solid material;

a guide device at said inlet, shaped to impart a rotary motion about the axis of the separating chamber to said primary gas stream;

the guide device including a roof member positioned immediately above said inlet to deflect said primary gas stream radially outwards;

a lower annular plate member extending radially outwards from said guide device and defining a first annular gap between its outer peripheral edge and the inner wall of the chamber;

an axially positioned outlet at the top of the chamber; an upper annular plate member extending radially outwards from said outlet and defining a second annular gap between its outer peripheral edge and the inner wall of said chamber; and means above said second annular gap to receive said secondary gas stream, shaped to impart a rotary motion about the axis of the chamber in the same sense as that of the primary gas stream to said secondary gas stream whereby said rotating secondary gas stream passes through said second annular gap into said separating chamber.

2. A device as claimed in claim 1, wherein the lower annular plate member extends radially outwards and downwards from said guide device and the upper annular plate member extends radially outwards and downwards from said outlet.

3. A device as claimed in claim 1, wherein said shaped means above said upper annular clearance is a spiral air duct having an outlet tangential to the upper annular clearance.

4. A device as claimed in claim 1, wherein said roof member is a conical casing located apex-upward within said chamber.

5. A device as claimed in claim 4, wherein the guide device comprises a lower disk-shaped member having a central inlet orifice, and the conical casing is spaced over the disk-shaped member to define a peripheral outlet, and angled guide members lying between said disk-shaped member and said conical casing to impart a rotary motion to the flow of gas.

6. A device as claimed in claim 5, wherein means are provided to vary the spacing between said disk-shaped member and said conical casing.

TABLE I

| Type of wind separator | Test No. | Test | Secondary air, m.³/h. | Primary air, m.³/h. | Material fed in kg./h. | Coarse fraction, percent | Fine fraction, percent | Splitting limit, μm. | Sharpness, percent |
|---|---|---|---|---|---|---|---|---|---|
| Conventional | 1 | | 1,050 | *1,050 | 300 | 65 | 35 | 37 | 32 |
| Wind separator according to invention | 2 | Ia | 1,950 | 1,700 | 1,140 | 59 | 41 | 47 | 13.5 |
| | | Ib | 1,900 | 1,680 | 1,250 | 51 | 49 | 62 | 17.5 |
| | | IIa | 3,000 | 1,200 | 1,140 | 80 | 20 | 9 | 6.2 |
| | | IIb | 3,100 | 1,180 | 1,125 | 68 | 32 | 36 | 6.5 |
| | | IIIa | 2,800 | 1,700 | 1,320 | 69 | 31 | 34 | 10.5 |
| | | IIIb | 2,600 | 1,700 | 1,200 | 37 | 63 | 85 | 17.5 |

*In the conventional wind separator there is no division into primary and secondary air stream. The stated air mass refers to the total air flow.